(12) United States Patent
Kumar et al.

(10) Patent No.: US 6,280,584 B1
(45) Date of Patent: *Aug. 28, 2001

(54) COMPLIANT BOND STRUCTURE FOR JOINING CERAMIC TO METAL

(75) Inventors: Ananda H. Kumar, Milpitas; Kadthala R. Narendrnath; Shamouil Shamouilian, both of San Jose, all of CA (US)

(73) Assignee: Applied Materials, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,317

(22) Filed: Jul. 29, 1998

(51) Int. Cl.[7] .................................................. H02N 13/00
(52) U.S. Cl. ........................ 204/298.15; 204/298.06; 204/192.1; 204/192.11; 204/192.12; 118/666; 118/723 R; 118/728; 118/69; 427/569; 361/234; 228/122.1; 228/56.3
(58) Field of Search ................... 204/298.15, 298.06, 204/192.1, 192.11, 192.12; 118/666, 723 R, 728, 69; 427/569; 361/234; 228/122.1, 56.3

(56) References Cited

U.S. PATENT DOCUMENTS

| | | |
|---|---|---|
| 4,338,380 | 7/1982 | Erickson et al. ................... 428/594 |
| 5,011,658 | 4/1991 | Niedrich ............................... 420/558 |
| 5,737,178 * | 4/1998 | Herchen .............................. 361/234 |
| 5,794,838 * | 8/1998 | Ushikoshi et al. .................. 228/121 |
| 5,886,863 * | 3/1999 | Nagasaki et al. ................... 361/234 |
| 5,998,041 * | 12/1999 | Makino et al. ...................... 428/621 |
| 6,134,096 * | 10/2000 | Yamada et al. ..................... 361/234 |

FOREIGN PATENT DOCUMENTS

| | | |
|---|---|---|
| 4-287344 * | 10/1992 | (JP) . |
| 9-45757 * | 2/1997 | (JP) . |

OTHER PUBLICATIONS

Edison Welding Institute, 2–page article entitled, "SP–100 Compliant Pad for High Thermal Stress Joints" (Date Unknown).

* cited by examiner

Primary Examiner—Alan Diamond
(74) Attorney, Agent, or Firm—Janah and Associates

(57) ABSTRACT

A compliant bond structure 20 comprising wire mesh 25 strands 50 surrounded by compliant metal 40 is useful for bonding a ceramic surface 30 to a metal surface 35. The wire mesh 25 comprises interlocking strands 50 having longitudinal axes that are oriented substantially parallel to the ceramic and metal surfaces 30, 35. More preferably, the wire mesh 25 comprises strands having a coefficient of thermal expansion that is about 0.4 to about 1.6 times the average of the coefficients of thermal expansion of the metal and ceramic surfaces 30, 35.

64 Claims, 3 Drawing Sheets

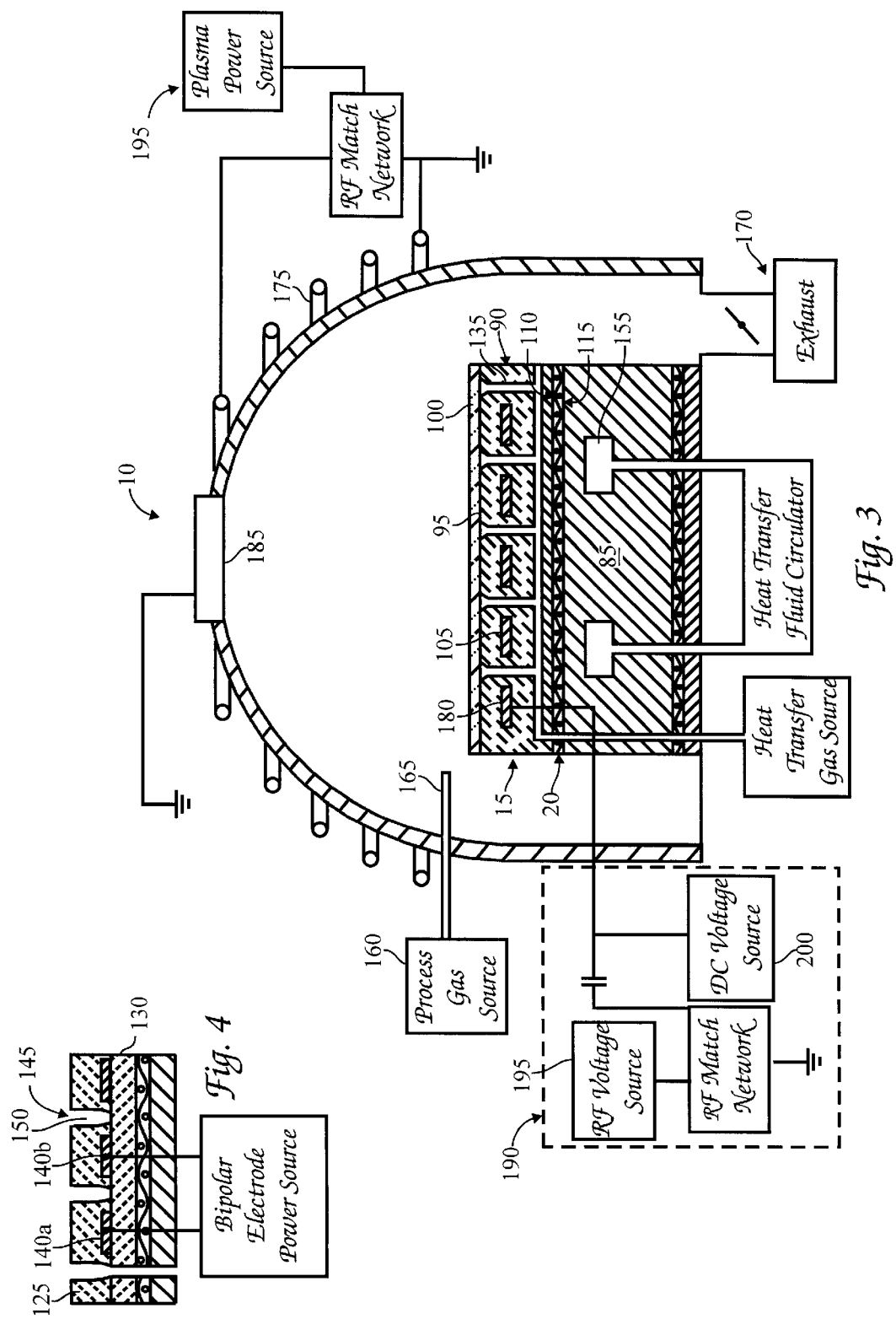

COMPLIANT BOND STRUCTURE FOR JOINING CERAMIC TO METAL

BACKGROUND

The present invention is directed to a bond structure for joining ceramic to metal surfaces, and in particular for bonding electrostatic chucks in semiconductor process chambers.

Ceramic surfaces are joined or attached to metal surfaces in a variety of industries for a variety of applications. For example, ceramic surfaces are joined to metal to form sealing joints between light bulbs and metal casings, joints between ceramic insulation and metal furnace skins, and various joints in semiconductor process chambers. In many of these applications, it is desirable to form a ceramic to metal bond that provides uniform and relatively high thermal transfer rates through the thickness of the joint interface. It is also desirable for the bond to withstand the thermal stresses arising from the large difference in coefficient of thermal expansion of the ceramic and metal materials. It is further desirable for the bond to be resistant to erosion or chemical degradation in the erosive gaseous environments, such as the gaseous plasmas.

Ceramic surfaces can be bonded to metal surfaces using commercially available polymeric adhesives. Although polymeric adhesives provide compliant bonds that can withstand high thermal stresses, the polymers typically degrade rapidly in erosive chemical environments such as oxygen plasmas, and have limited ability to withstand elevated temperatures. Also, the relatively low thermal conductivity of polymeric adhesives provides a bond having high thermal impedance and low thermal transfer rates through the thickness of the bond. In addition, polymeric adhesives are generally applied in relatively thick layers and variations in the thickness of the polymeric layer can result in variable thermal impedances across the bond layer.

In another type of bond or joint, the ceramic surface is bonded directly to the metal surface using a metal braze or solder. Such brazed bonds are generally less susceptible to chemical or erosion damage. However, the brazed bonds are subject to thermal stresses that arise from the large difference in thermal expansion coefficients between the ceramic and the metal braze. A large mismatch in thermal expansion coefficients can cause the bond to break or form microcracks at the bond interface. These microcracks eventually result in catastrophic failure of the bond and separation of the metal and ceramic material.

Yet another type of ceramic-to-metal bond uses a solid interposer layer having a thermal expansion coefficient that is half-way between the thermal expansion coefficients of the metal and ceramic surfaces. For example, the thermal expansion coefficient of copper of about 16 ppm/° C., is approximately half-way between the thermal expansion coefficients of certain metal and ceramics, is commonly used for this purpose. However, a relatively thick copper plate is needed to withstand the bending stresses between the ceramic and metal layers without bowing of the layers, resulting in a thicker bond that provides reduced thermal expansion tolerance at high temperatures.

Ceramic to metal bonds that are used to join components in semiconductor fabrication apparatus have particularly high thermal conductance and erosion resistance requirements. For example, such bonds are needed to bond ceramic electrostatic chucks in the semiconductor process chamber. A typical electrostatic chuck comprises a ceramic insulator having an electrode embedded therein. The electrostatic chuck is bonded to a metal support or pedestal in the chamber. When a voltage is applied to the electrode, electrostatic attractive forces resulting from opposing electrostatic charges, hold a silicon substrate to the ceramic insulator of the chuck during processing of the substrate in the chamber. Because many processes can raise the temperature of the substrate to undesirable temperatures, the substrate and the electrostatic chuck are often cooled by conduction through the metal support. However, conventional ceramic to metal bonds have a low thermal impedance that provides reduced heat dissipation from the substrate through the chuck. These bonds also provide low resistance to erosion or failure in the process environment used to process the substrate.

Thus it is desirable to have a bond suitable for joining metal and ceramic layers that does not degrade or erode at elevated temperatures or in erosive process environments. It is further desirable for the metal to ceramic bond to have a low thermal impedance and a low variability in thermal impedance across the thickness of the bond layer. It is also desirable to obtain a compliant bond joint that can tolerate thermal expansion stresses without catastrophic failure. It further desirable to have a bond that provides high thermal transfer rates through the bond line.

SUMMARY

The present invention relates to a compliant bond structure for bonding a ceramic surface to a metal surface, that provides reduced thermal expansion mismatch and elevated thermal conductance. The bond structure comprises a wire mesh surrounded by compliant metal that is positioned between the ceramic and metal surfaces. Preferably, the wire mesh comprises interlocking strands, the strands having their longitudinal axes that are oriented substantially parallel to the ceramic and metal surfaces. More preferably, the wire mesh comprises strands having a coefficient of thermal expansion that is about 0.4 to about 1.6 times the average of the coefficients of thermal expansion of the metal and ceramic surfaces.

In another aspect, the present invention relates to a process chamber for processing a substrate, the chamber comprising an electrostatic chuck comprising a ceramic member with an electrode embedded therein. The chuck has an upper surface for receiving a substrate and a lower surface capable of conducting heat from the chuck. The process chamber further comprises a support having a support surface for supporting the lower surface of the chuck. An wire mesh embedded in a compliant metal bonds the lower surface to the support surface. The wire mesh comprising interlocking strands having longitudinal axes that are oriented substantially parallel to the lower ceramic surface and the support surface. Typically, the support surface comprises a metal surface of a metal support member having heat transfer circulating channels therein. During use of the chamber, a voltage is supplied to the electrode of the electrostatic chuck to electrostatically hold the substrate to the upper surface of the chuck, and a plasma is formed from process gas introduced into the chamber. The temperature of the substrate held on the chuck is regulated by circulating heat transfer fluid through the channels in the metal support. The compliant bond provides a good thermal expansion match between the ceramic and metal surfaces and excellent heat transfer rates for removing heat from the substrate.

In yet another aspect, the present invention relates to a method of forming a compliant bond between a ceramic surface and a metal surface. In the method, a wire mesh is formed using conventional methods is soaked in a molten compliant metal. The wire mesh soaked in molten metal is inserted between the ceramic and metal surfaces and cooled to form a compliant bond structure joining the metal and ceramic surfaces. Alternatively, a metal covered wire mesh is inserted between the ceramic and metal surfaces, and the resulting assembly heated to a temperature above the melting point of the compliant metal while a pressure is applied. Upon cooling, a strong and compliant bond is formed between the metal and ceramic surfaces.

DRAWINGS

The features, aspects, and advantages of the present invention will become better understood with regard to the following description, appended claims, and accompanying drawings which illustrate versions of the invention, where:

FIG. 1b is a detailed schematic view of a section of the compliant bond of FIG. 1a;

FIG. 1c is a schematic sectional top view of the wire mesh of the compliant bond structure of FIG. 1a;

FIG. 3 is a partial sectional schematic side view of a plasma process chamber according to the present invention; and FIG. 4 is a sectional schematic view of a compliant bond used to join a bipolar electrode chuck to a metal support.

DESCRIPTION

The bond structure of the present invention is useful for bonding high thermal expansion materials, and in particular for bonding ceramic and metal surfaces to one another. The complaint bond of the present invention provides a low stress joint having a relatively thin bond line and high heat transfer rates through the bond.

Bonds formed using the composition and process of the present invention also have high shear strengths and excellent erosion resistance in plasma environments. Although use of the present invention is illustrated using examples of semiconductor process chambers 10 and electrostatic chucks 15, the invention can also be used in other structures, such as ceramic structures and coatings for electronic, magnetic, and mechanical applications, as apparent to those skilled in the art, without deviating from the scope of the invention. Thus the present invention should not be limited to the illustrative embodiments described herein.

Figure 1A:
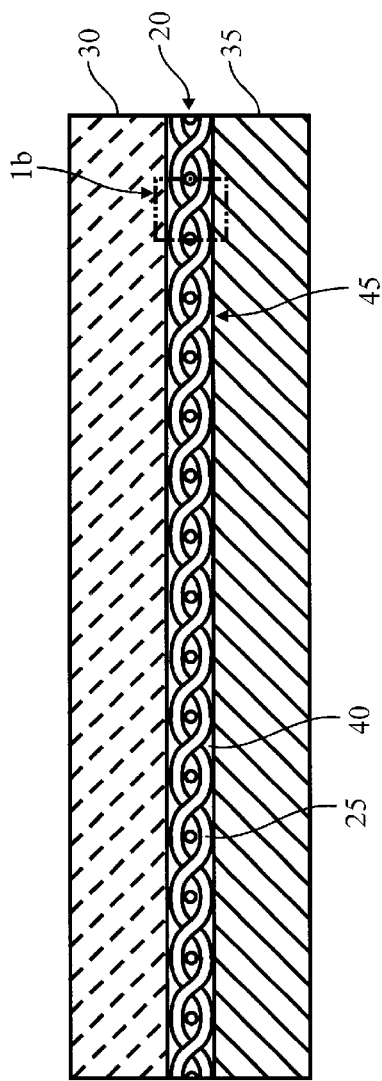
FIG. 1a is a schematic sectional view of a compliant bond structure according to the present invention.
Figure 1C:
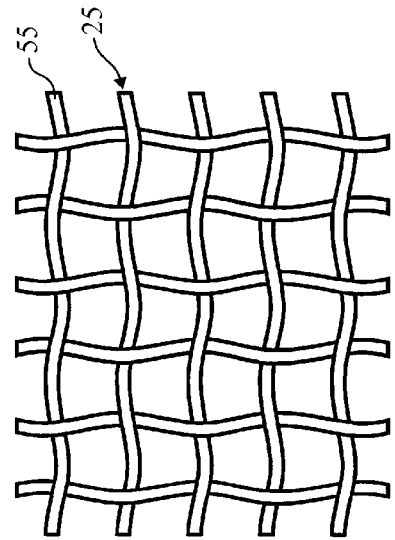
Figure 1B:
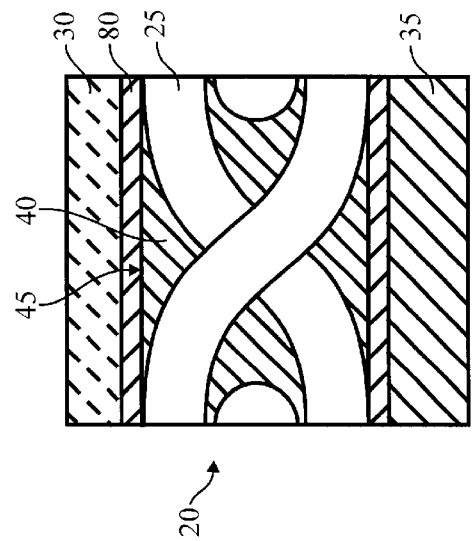

Referring to FIGS. 1a through 1c, the compliant bond structure 20 comprises a wire mesh 25 between the ceramic surface 30 and metal surface 35 and a compliant metal 40 surrounding the wire mesh. The compliant metal 40 is soaked into the wire mesh 25 in a molten state to form a compliant metal matrix 45 with the wire mesh embedded therein. The wire mesh 25 embedded in the complaint metal 40 is positioned between the ceramic and metal surfaces 30, 35 and heat treated or pressure treated to form a compliant bond between the two surfaces. The resultant compliant bond has a high tolerance to the thermal expansion mismatch between the two surfaces 30, 35 and provides excellent heat transmission and conductance properties.

The wire mesh 25 of the compliant bond 20 is formed by a suitable conventional woven, knit, weave, or other fiber interlocking method, to form a wire mesh 25 comprising interlocking wires or strands 50 that are interlaced, woven, looped, or knotted together in a regular repetitive design to form a cohesive and strong one-dimensional wire element. Preferably, the wire mesh 25 comprises strands 50 that are substantially in the same plane, each strand having a longitudinal central axis that is oriented substantially parallel to the plane corresponding to the ceramic and metal surfaces 30, 35. This maximizes the tensile strength of the wire mesh 25 along the longitudinal axis of the strands 50 that form the mesh structure. The increased tensile strength provides a compliant bond capable of withstanding higher thermal stresses and that has greater compliance in the direction parallel to the plane of the ceramic and metal surfaces 30, 35. When the ceramic and the metal surfaces 30, 35 have a high linear thermal expansion along their surfaces, the net thermal expansion along the plane of the surfaces is higher than in the perpendicular direction. As a result, the increase in length of the metal and ceramic surfaces 30, 35 occurs largely in the planar surface direction. Accordingly, it is desirable to orient the strands 50 of the wire mesh 25 in the same plane as the metal/ceramic surfaces to provide high linear or dimensional thermal expansion to allow the strands of the wire mesh 25 to absorb a greater tensile load and provide more compliance in these directions.

Figure 2A:
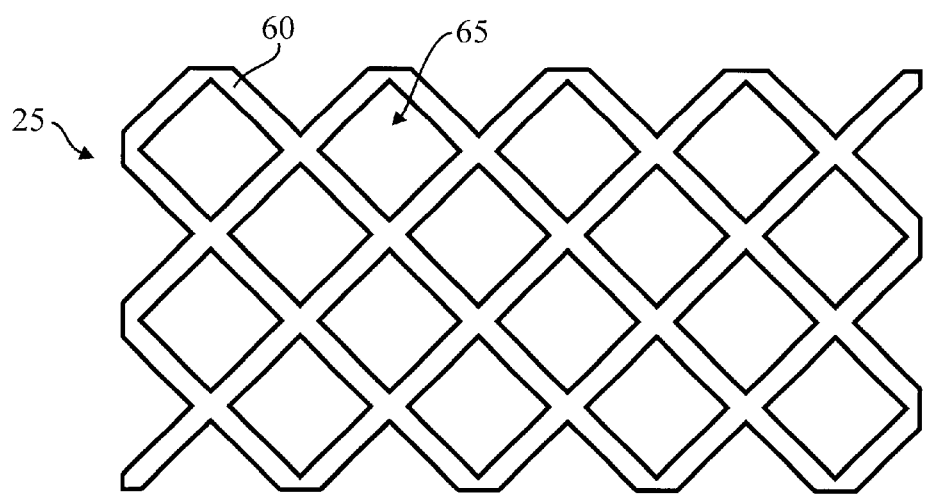
FIG. 2a is a schematic sectional top view of another version of a wire mesh of a compliant bond structure according to the present invention.
Figure 2B:
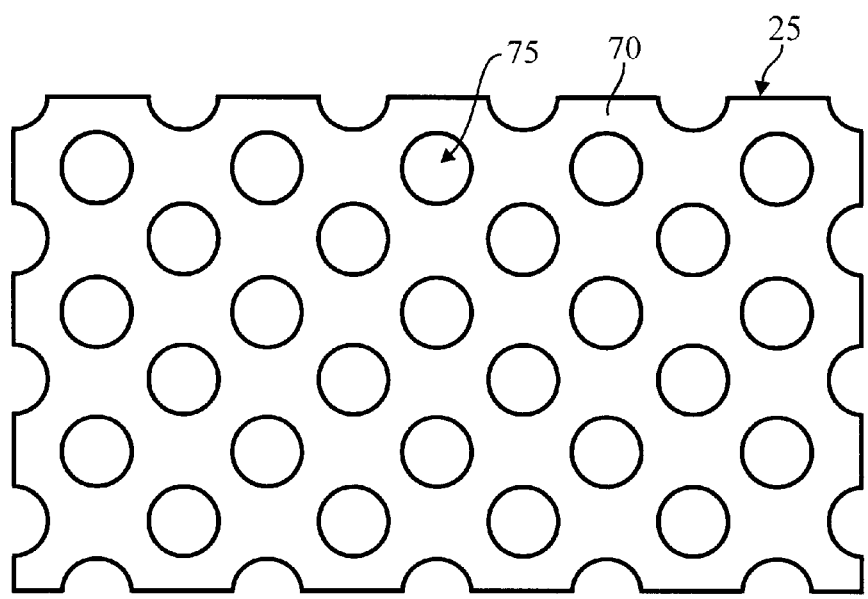
FIG. 2b is a schematic sectional top view of yet another version of a wire mesh of a compliant bond structure according to the present invention.

In one embodiment, the wire mesh 25 can comprise single wire strands 50 that are interlocked in a predetermined woven structure that is planar to the ceramic and metal surfaces 30, 35. The wire strands 50 interlock at right angles to one another, with first strands looping above and below perpendicular second strands, as shown in FIG. 1c. The right angled interlocked strands provide good compliance in the plane of the strands. In another embodiment, a metal sheet 60 is punched out or perforated with linear slits (or triangular or diamond holes) 65 and then stretched out to form the triangulated diamond shaped, mesh structure shown in FIG. 2a. Alternatively, the wire mesh 25 can comprise bundles of strands 50 woven or felted together in a gauze pattern 70, as shown in FIG. 2b, in which holes or apertures 75 are punched out. The resultant gauze pattern structure 70 has a high tensile strength in the plane parallel to the strands 50 that provides a strong bond that is less susceptible to detaching or delaminating from the plane of the ceramic and metal surfaces 30, 35. The wire mesh 25 can also comprise a web of randomly interlocking strands 50 having longitudinal axes that are oriented substantially parallel to one another, the parallel wires also being parallel to the plane of the ceramic and metal surfaces 30, 35.

The wire mesh 25 can be fabricated from metal, ceramic, or polymeric strands 50. Preferably, the thermal expansion coefficient of the strands 50 used in the wire mesh 25 lie between the thermal expansion of the ceramic and metal surfaces 30, 35, and more preferably, the CTE of the strands is from 25 to 75% of the average CTE of the ceramic and metal surfaces 30,35. A suitable coefficient of the thermal expansion of the strands 50 is from about 0.4 to about 1.6 times the average coefficient of thermal expansion of the ceramic and metal surfaces 30,35. This provides a metal lattice or framework that can expand at an expansion rate that is between the rate of expansion of the ceramic and metal surfaces 30,35, to provide resistance to delamination or separation, from either of the ceramic or metal surfaces 30, 35.

Suitable metals for forming the strands 50 include copper, aluminum, or 304 stainless steel fibers. For high temperature process chambers 10, the wire strands 50 comprise refractory metal fibers such as tungsten silicide, molybdenum silicide, tungsten, or titanium fibers, to provide a high temperature withstanding bond. In addition, ceramic fibers such as aluminum oxide, zirconium oxide, silicon oxide, carbon, boro-nitride, and silicon carbide fibers can also be used for even higher temperatures and erosion resistant applications. The wire mesh 25 has a thickness sufficiently small to provide rapid and efficient heat transfer from the ceramic surface to the metal surface, and vice versa. Preferably, the wire mesh 25 has a thickness of about 25 to 2000 microns (0.001" to 0.08"), and more preferably from about 25 to 250 microns (0.001" to 0.010").

In each of these configurations, the apertures 75 between the wire mesh 25 structure allows the compliant metal 40 to seep between the apertures 75 to firmly and cohesively bond the ceramic and metal surfaces 30, 35 together. Thus apertures 75 are sized sufficiently large to provide a strong and compliant bond between the two surfaces 30, 35. Preferably, the wire mesh 25 comprises apertures 75 having a total area of from about 10% to about 60% of the surface area of the wire mesh, and more preferably a total area of from about 30% to about 50%. The individual apertures 75 generally have a diameter or width of from about 25 $\mu$m to about 2000 $\mu$m depending on the size of the wire strands 50 used. The interlocking wire mesh 25 structure is woven to provide the desired number of apertures 75 and aperture size.

A compliant metal 40 having a high ductility and a low melting temperature is used to form the metal matrix 45 in which the wire mesh 25 structure is embedded. The compliant metal 40 partially or completely fills the intervening spaces in the wire mesh 25, to provide a flexible bond layer which can absorb the thermal stresses produced by the differing coefficients of thermal expansion of the ceramic and metal surfaces 30,35. In addition, the metal matrix 45 is softer and more ductile and provides greater tolerances to microcracks that can occur within the strands 50 and at the interfaces of the ceramic and metal surfaces 30, 35 with the bond structure. Suitable compliant metals comprise a Young's Modulus of elasticity of at least about $2 \times 10^6$ psi; and more preferably from about $10 \times 10^6$ psi to about $20 \times 10^6$ psi.

Preferred compliant low melting point metals include indium which has a melting point of 156° C.; lead of 320° C.; magnesium of 570° C.; tin of 230° C.; or zinc of 390° C. Additional low melting point compliant metal 40 compositions can also be fabricated from a mixture of lead, tin, and bismuth. For example, suitable compositions include (i) 25 wt % lead, 25 wt % tin, and 50 wt % bismuth which provide an alloy having a melting point of 266° F.; (ii) 50 wt % lead, 37.5 wt % tin, and 12.5 wt % bismuth which provide an alloy having a melting point of 374° F.; and (iii) 25 wt % lead, 50 wt % tin, and 25 wt % bismuth which provide an alloy having a melting point of 336° F. Low temperature compliant metals can also be fabricated from mixtures of aluminum and silicon, copper and phosphorous, silver, copper, zinc, nickel, or from soft solder metal alloys, such as ASTM 70A, 70B, 63A, 63 B, 60A and 60B; as will be apparent to those skilled in the art.

In a preferred embodiment, a layer of a surface wetting compound 80 is applied to one or more of the ceramic and metal surfaces 30, 35 to be joined. Suitable wetting compounds 80, include metal layers, such as for example, nickel or aluminum, which have a low surface tension in air. When deposited on the ceramic and metal surfaces 30, 35 to be joined, the thin surface wetting layers 80 improve adhesion between the compliant metal matrix 45 of the bond structure and the surfaces 30, 35 to be joined by enhancing the flow of the compliant metal 40 over the surfaces. Preferably, the wetting compound 80 comprises a thin layer of nickel that is deposited on the ceramic and metal surfaces 30, 35 by conventional chemical or vapor deposition methods. The thickness of the surface wetting compound 80 is typically from about 1 $\mu$m to about 100 $\mu$m.

A preferred compliant bond structure 20 comprises a flat, one dimensional, weave of interlocking copper strands 50 in the pattern shown in FIGS. 1a to 1c. Preferably, the coefficient of thermal expansion (CTE) of the metal strands 50 of the wire mesh 25 lies between the coefficients of thermal expansion of the ceramic and metal surfaces 30, 35. More preferably, the CTE of the wires strands 50 is from 0.4 to 1.6 times the average of the coefficients of thermal expansion of the metal and ceramic materials that are being joined to one another. For example, to join a ceramic surface such as an aluminum nitride surface having a CTE of 5 ppm/° C., to a metal surface such as aluminum having a CTE of 27 ppm/° C., a suitable metal wire material comprises a thermal expansion coefficient of 12 to 20 ppm/° C. Copper wire is preferred because copper has a coefficient of thermal expansion of about 16 PPM/° C., which is halfway in between the CTE for aluminum and that for aluminum nitride. Thus a preferred embodiment of the compliant bond for joining an aluminum nitride surface to an aluminum surface, that provides excellent thermal transmission rates and ease of fabrication, comprises interlocking wire strands 50 of copper in a compliant metal matrix 45 of indium.

A method of forming the compliant bonding joint between a ceramic surface and a metal surface according to the present invention will now be described. In the method, the ceramic and metal surfaces 30, 35 to be joined are cleaned by conventional wet or dry etching methods to remove any contaminants or native oxide layers. For example, aluminum metal surfaces and silicon dioxide ceramic surfaces can be both cleaned using a plasma of fluorine-containing species, such as $CF_4$, $CHF_3$, $CF_3H$, or $C_2H_2F_2$. Suitable wet chemical etchants for cleaning metals include nitric acid, hydrofluoric acid, hydrochloric acid, sulfuric acid, acetic acid, phosphoric acid, fluoroboric acid, or mixtures thereof. The wet chemical etchant is mixed with water to dilute the etchant in order to obtain a controlled and uniform etch. Preferably, the strength of the acid is from about 1% to about 80% by volume, and more preferably from about 20% to about 60% by volume. After the ceramic and metal surfaces 30, 35 are cleaned, the surface wetting compound 80 is applied on one or more of the surfaces. The wetting layer 80 is typically deposited by electroplating, sputtering, or CVD, using conventional deposition methods.

Generally, the wire mesh 25 of interlocking strands 50 is fabricated using suitable weaving, knitting, or felt-forming technology. A binder is used to secure the strands 50 to one another in the mesh 25 structure at least until the mesh structure is soaked in the compliant metal matrix 45. The binder is an organic material that burns out at elevated temperatures leaving little or no residue in the bond structure. Binders are used more often for wire meshes 25 that are made using thin wires 50, such as felt-like materials, where the thin wires are intertwined together to form the wire mesh. Suitable binders include poly vinyl acetate, clay, and talc.

The wire mesh 25 covered with a layer of complaint metal that surrounds the individual wire strands. For example, the wire mesh 25 can be dipped or soaked in a molten compliant metal 40 that is melted in a tank lined with refractory tiles. The refractory tiled melting tank is heated using a conventional heater fabricated from molybdenum disilicide or nichrome wires, to temperatures above the melting temperature of the metal. The wire mesh 25 is dipped into the molten metal and promptly inserted between the ceramic and metal surfaces 30, 35 that are to be joined. The metal on the wire mesh 25 at least partially solidifies during this operation. The melt covered wire mesh 25 is slowly cooled to form a compliant bond structure 20 joining the ceramic and metal surfaces 30, 35 to one another. The cooling rate is typically from about 5 to about 30° C./min.

Preferably, after positioning the melt covered wire mesh 25 between the ceramic and metal surfaces 30, 35, a pressure is applied onto the two surfaces surrounding the melt covered wire mesh 25 to force the two surfaces against the wire mesh and to squeeze out excess molten metal and form a strong and adherent bond. The weight of the ceramic and metal components can be sufficient to apply this pressure. Alternatively, the bond assembly can be placed in a pressure applying machine, such as a platen press or isostatic press. The wire mesh 25 assembly is heated to a temperature suitable for at least partially remelting or causing the compliant metal 40 to flow within the wire mesh strands 50, and a pressure suitable for squeezing the wire mesh structure is applied on the two surfaces 30, 35 using the pressure applying machine. For example, a suitable heat and pressure treatment for a compliant metal matrix 45 including indium comprises a temperature of about 170° C., for about 5 minutes, under a pressure of about 40 psi. Compression of the compliant metal matrix 45 under the applied pressure squeezes out excess compliant metal 40 and forms a compressed bond structure between the ceramic and metallic surfaces 30, 35.

Alternatively the surfaces 30, 35 to be joined are first heated to a temperature above the melting point of the compliant metal 40 to be used, and the compliant metal is painted on the surfaces using molten metal or a powder of the metal. The two surfaces 30, 35 thus coated are allowed to cool and then brought together with the interlocking wire mesh 25 interposed in between. This assembly is heated on a hot plate with a weight placed over it. When the compliant metal 40 melts, the compression squeezes out excess compliant metal on the ceramic and metallic surfaces 30, 35, bonding the strands 50 of the wire mesh 25 to one another and the surfaces to be joined.

The compliant bond structure 20 will now be illustrated in the context of bonding a ceramic surface to a metal surface for use in a semiconductor plasma process chamber 10, and in particular bonding a ceramic electrostatic chuck 15 to a metal support 85. However, it should be understood that the compliant bond structure 20 can be used for other applications, and the scope of the present invention should not be limited to the illustrative examples provided herein.

With reference to FIG. 3, a typical electrostatic chuck 15 comprises a ceramic member 90 having a receiving surface 95 for supporting a substrate 100 thereon, and having embedded therein an electrode 105 for generating electrostatic charge to electrostatically hold the substrate to the chuck 15. The ceramic member 90 also comprises a lower surface 110 for conducting heat from the chuck 15. The metal support 85 below the chuck 15 has a metal support surface 115 for receiving the lower surface 110 of the chuck 15. Preferably, the ceramic member 90 comprises a dielectric material having a low RF absorption that is sufficiently low to allow a RF power generator to capacitively couple RF power through the overlying ceramic member, without excessive attenuation of the RF power. The compliant bond 20 of the present invention, comprising a wire mesh 25 embedded in a compliant metal 40, is used to join the lower surface 110 of the ceramic member 90 and the metal support surface 115 of the underlying support member 85. The wire mesh 25 comprises interlocking strands 50 that each have longitudinal axes that are oriented substantially parallel to the ceramic and metal surfaces 30, 35.

Preferably, the ceramic member 90 comprises a unitary monolithic ceramic structure with the embedded electrode 105, having low porosity levels of less than about 20% porosity, and more preferably less than about 10% porosity. The receiving surface 95 of the ceramic member 90 that directly contacts the substrate 100 comprises a smooth surface having an RMS peak to peak roughness of less than 10 microns to provide uniform thermal transfer rates therebetween. The ceramic member 90 is shaped and sized to match the shape and size of the substrate 100. Suitable ceramic monoliths are fabricated by isostatic pressing, hot pressing, or mold casting. Alternatively, the ceramic member 90 can comprise a laminate construction of ceramic layers stacked around the electrode 105 or around bipolar electrodes 140a, 140b, as shown in FIG. 4. The thickness of dielectric layers that are above and below the electrode 105 depends upon the electrical properties of the dielectric material, such as dielectric constant, resistivity, and thickness. Preferably, the thickness of an upper dielectric layer 125 covering the electrode 105 or bipolar electrodes 104a, 140b is sufficiently thin to allow the substrate 100 to be held to the chuck 15 by electrostatic attraction forces. A suitable thickness of the upper dielectric layer 125 covering the electrode is from about 100 microns to about 1 mm, for dielectric materials that have a dielectric constant of about 2. A lower dielectric layer 130 below the electrode 105 or bipolar electrodes 140a, 140b electrically isolates the electrode from the underlying support. A suitable thickness for the lower dielectric layer 130 is from about 100 microns to about 5 mm, for dielectric materials having a dielectric constant of about 2.

The ceramic member 90 can also comprise one or more heat transfer gas channels 135 that pass through the chuck 15 and terminate at the receiving surface 95 of the ceramic member to provide heat transfer fluid, typically helium, below the substrate 100 to maintain uniform temperatures across the substrate. (As shown in FIG. 3.) When the electrode 105 is activated the substrate 100 is attracted toward and presses against the conformal contact surface 95 of the ceramic member 90. Typically, on a microscopic level, only a small part of the substrate 100 actually contacts the contact surface 95. Heat transfer fluid below the substrate 100 flows into the microscopic gap between the substrate and the contact surface 95, providing thermal coupling by gas conduction between the substrate and the contact surface, and enhanced thermal transfer between the non-contacting portions of the substrate and the contact surface. The substrate 100 presses against the contact surface 95 to define an outer periphery that prevents leakage of heat transfer fluid from between gaps in the outer periphery.

The electrode 105 embedded in the ceramic member 90 is fabricated from a conducting metal such as aluminum, copper, silver, gold, molybdenum, tantalum, titanium, or mixtures thereof. Preferred metals comprise high melting point metals, such as copper, tantalum, tungsten, platinum, rhenium, hafnium, and alloys thereof; which are preferred when the ceramic member 90 is formed using high temperature processing methods. The electrode 105 can comprise a layer of conducting material, for example a copper layer about 1 to about 100 microns thick, that is embedded in the ceramic member 90. Alternatively, the electrode can comprise a mesh 25 of wire having a diameter of about 0.01 to about 1 mm, a mesh size of about 5 to 200 mesh, and a circular, elliptical or rectangular cross-section. The electrode 105 should comprise an area sufficient to securely hold the substrate 100 to the chuck 15 by electrostatic attraction forces. Preferably, the electrode 105 comprises an area of from about $10^{-4}$ to $10^{-1}$ times the area of the substrate 100. For a substrate 100 having a diameter of 200 to 300 mm (6 to 8 inches), the electrode 105 typically comprises an area of about 50 to about 250 mm².

The electrode 105 can comprise a monopolar electrode as illustrated in FIG. 3, or a bipolar electrode as shown in FIG. 4, that comprises at least two separate electrodes substantially coplanar to one another, and to which different electrical potentials are applied to generate substantially equivalent electrostatic clamping forces. The bipolar electrodes comprise one or more conductors 140a, 140b that are electrically isolated from one another by electrical isolation voids 145 and maintained at different electric potentials. Bipolar electrode configurations are particularly advantageous for non-plasma processes in which there are no charged plasma species to serve as charge carriers for electrically biasing the substrate 100. The bipolar electrode can be configured as opposing semicircles, or inner and outer rings of electrodes. In one advantageous configuration, the electrical isolation voids 145 are sized and configured to serve as grooves 150 in the receiving surface 95 for holding heat transfer gas therein.

The support 85 below the ceramic member 90 is made of an electrically conducting material, typically metal, and has an upper surface 115 suitable for supporting the ceramic member, and for conducting heat at high thermal transfer rates from the ceramic member. In a typical configuration, the metal support 85 comprises a metal plate, such as an aluminum plate, sized and shaped to correspond to the dimensions of the ceramic member 90 and the substrate 100. For example, if the substrate 100 is disk shaped, a right cylindrically shaped metal support 85 is preferred. For a circular substrate 100 having a diameter of about 200 mm (8-inch), a suitable metal support 85 comprises an aluminum plate having a diameter of about 200 to about 220 mm, and a thickness of about 1.5 cm to 2 cm.

Preferably, the metal support 85 further comprises a plurality of conduits 155 for circulating heat transfer fluid in the chuck 15. The heat transfer fluid can be any liquid or gas capable of transferring heat to the chuck 15, or removing heat from the chuck. The heat transfer fluid has an elevated thermal conductivity to provide optimal thermal transfer rates between the support 85, chuck 15, and heat transfer fluid. The heat transfer fluid can be used to cool or heat the substrate 100 to achieve uniform temperatures on the substrate. When cooling of the substrate 100 is needed, the conductor support 85 is maintained at a lower temperature than the substrate, so that the heat transfer fluid can transfer heat from the substrate to the metal support. Alternatively, when the substrate 100 is to be heated, the metal support 85 is maintained at a higher temperature than the substrate, so that the heat transfer fluid can transfer heat from the support to the substrate.

An electrostatic chuck 15 fabricated according to the present invention is used in process chambers 10 for performing physical or chemical vapor deposition, implantation, or etching processes. An exemplary plasma process chamber 10 suitable for etching substrates, is the high density plasma "HDP" etching apparatus, commercially available from Applied Materials, Inc., Santa Clara, Calif. As illustrated in FIG. 3, the process chamber 10 forms an enclosure for processing of a substrate. The chamber 10 includes a process gas source 160 for introducing process gas into the chamber 10 via a gas distributor 165, and a throttled exhaust 170 for controlling process pressure and exhausting gaseous byproducts from the chamber 10. A plasma is formed from the process gas using a plasma generator that couples an electric field into the chamber 10. The plasma generator can comprise an inductor coil 175 adjacent to the process chamber 10 that is capable of forming an inductive electric field in the chamber. Optionally, the plasma generator also includes a cathode, either the electrode 105 embedded in the chuck 15 or a separate electrode below the chuck, that capacitively couples with an anode 185 to form an electric field in the chamber. Generally, the electrode 105 functions as the cathode while the anode 185 comprises an electrically grounded portion of the chamber 10 ceiling. As shown in FIG. 3, a combined voltage supply 190 includes a RF source 195 to supply RF voltage to the plasma generators and a DC voltage source 200 that provides a DC chucking voltage to the electrode 105 to electrostatically hold the substrate 100 to the ceramic member 90.

To operate the chamber 10, the chamber is evacuated and maintained at a subatmospheric pressure. A robot transport mechanism (not shown) places a substrate 100 on the surface 95 of the chuck 15. Process gas is introduced in the process chamber 10 via the gas distributor 165 at a controlled pressure. The RF source 195 provides an RF voltage having one or more frequencies from 13.56 MHZ to 400 KHZ to the plasma generators to form a plasma in the chamber 10. The power level of the RF voltage applied to the cathode 105 and anode 185 is typically from about 50 to about 3000 Watts, and the RF power applied to the coil 175 is typically from about 100 to about 5000 Watts. The resultant electric field in the chamber 10 generates plasma ions from the process gas and/or attracts the plasma ions toward the substrate 100. The DC voltage applied to the chucking electrode 105 by the DC voltage source electrically biases the chuck electrode and the ceramic member 90 relative to the substrate 100. The DC chucking voltage applied to the electrode 105 is typically about 250 to about 2000 volts.

In the operation of a monopolar electrode 105, voltage applied to the monopolar electrode causes electrostatic charge to accumulate in the electrode, or near the surface 95 of the ceramic member 90 at the interface between the ceramic member and the overlying substrate 100. The plasma in the chamber 10 produces electrically charged species having opposing polarity which accumulate in the substrate 100. The opposing accumulated electrostatic charges results in Coulombic or Johnsen-Rahbek electrostatic attractive forces which hold the substrate 100 to the chuck 15. In the operation of bipolar electrode chucks, different electrical potentials are applied to two or more electrically isolated conductive elements 140a, 140b to induce opposing electrostatic charges in the conductor elements that cause the substrate 100 to be electrostatically held to the chuck 15.

During use of the chuck 15 in the process chamber 10, the chuck is heated by the impinging plasma ions, and generally expands more in length in the direction parallel to the surface 95 of the chuck, and less in the direction perpendicular to the chuck surface. The compliant bond 20 of the present invention holds the chuck 15 to the underlying support 85 without delaminating or otherwise failing at the interface between the ceramic chuck surface 110 and the metal support surface 115. This is partially because the wire mesh 25 expands in the same planar direction as the ceramic and metal surfaces 110, 115 and matches the thermal expansion of the two other surfaces. Also, the wire mesh 25 provides a flexing structure that can absorb at least some of the thermal stresses generated between the two surfaces 110, 115 without breaking up. In addition the compliant metal matrix 45 can also plastically deform and absorb thermal stresses by slip dislocation within the metal matrix, which further enhances the compliant nature of the bond between the two surfaces 110, 115.

The compliant bond 20 also provides excellent thermal transfer rates and uniformity of thermal transfer rates across the bond interface. The strong wet phase coupling between the compliant metal 40 and the surface wetting agents 80 applied to the ceramic and metal surfaces 110, 115 provides excellent thermal transfer rates between the metal and ceramic surfaces. The highly thermally conductive metal wire mesh 25 and compliant metal matrix 45 further aids thermal conductance. Furthermore, the use of a molten metal 40 to form the seal or joint between the two surfaces 110, 115 provides a relatively thin bonding joint that further enhances thermal conductance between the two surfaces.

Comparative experiments were also conducted to demonstrate the thickness and thermal conductance uniformity of the bond of the present invention. In these examples, a ceramic disc comprising a 0.4 mm thick aluminum nitride disc having a diameter of 210 mm, and a metal disc comprising a 2.54 cm thick aluminum plate of the same diameter, were used. In the first example, the aluminum nitride disc was attached to an aluminum plate using only a metal bond, i.e., indium. The aluminum plate and ceramic disc with solid indium interposed between was heated to a temperature above the melting point of indium. The indium solder was allowed to flow bonding the ceramic disc to the metal plate. Wire spacers inserted between the ceramic and metal surfaces were used to adjust the bond line to a thickness of about 0.254 mm. After the assembly was cooled to room temperature, the chamber of the outer surface of the ceramic disc was measured by conventional surface profiling methods to be between 45 and 85 microns. The relatively high camber provided an uneven bond thickness that resulted in non-uniform thermal transfer rates between the ceramic and metal discs. In a second example, the ceramic disc was joined to the metal plate by the bond structure of the present invention, comprising a wire mesh of interlocked woven copper strands, the wire mesh having a thickness of about 0.254 mm. The wire mesh was dipped in molten indium and then interposed between ceramic and metal surfaces. The assembly was heated using a conventional hot plate to a temperature above the melting point of indium and pressure was applied on the assembly to force out excess indium. After cooling the assembly to room temperature, the camber of the outer surface of the ceramic disc was measured to be 5 to 15 microns. The low degree of camber is desirable for bonding electrostatic chucks and provides uniform and high thermal transfer rates between the substrate and the chuck.

Although the present invention has been described in considerable detail with reference to certain preferred versions, many other versions should be apparent to those skilled in the art. Therefore, the spirit and scope of the appended claims should not be limited to the description of the preferred versions contained herein.

What is claimed is:

1. A support assembly capable of supporting a substrate in a process chamber, the support assembly comprising:
   (a) an electrostatic chuck comprising a ceramic having an electrode therein, the electrostatic chuck having an upper surface capable of receiving the substrate and a lower surface;
   (b) a support having a support surface capable of supporting the lower surface of the electrostatic chuck; and
   (c) a bond between the lower surface and the support surface, the bond comprising a wire mesh.

2. The support assembly of claim 1 wherein the wire mesh comprises strands substantially parallel to the lower surface and the support surface.

3. The support assembly of claim 1 wherein the wire mesh comprises interlocking strands.

4. The support assembly of claim 3 wherein the strands comprise copper, aluminum, or steel.

5. The support assembly of claim 3 wherein the interlocking strands are oriented relative to one another.

6. The support assembly of claim 3 wherein the interlocking strands are randomly oriented.

7. The support assembly of claim 1 wherein the wire mesh comprises strands that are woven or felted.

8. The support assembly of claim 1 wherein the wire mesh comprises a metal, ceramic or polymer.

9. The support assembly of claim 1 wherein the wire mesh is in a metal.

10. The support assembly of claim 9 wherein the metal comprises one or more of indium, lead, magnesium, tin, bismuth, aluminum, copper, silver, zinc, and nickel.

11. The support assembly of claim 9 wherein the wire mesh comprises copper and the metal comprises indium.

12. The support assembly of claim 1 further comprising a surface wetting compound applied on one or more of the lower surface and the support surface.

13. The support assembly of claim 1 wherein the wire mesh comprises a thickness of from about 25 microns to about 2000 microns.

14. The support assembly of claim 1 wherein the support comprises a metal support having heat transfer fluid circulating channels capable of circulating heat transfer fluid therethrough.

15. A support assembly capable of supporting a substrate in a process chamber, the support assembly comprising:
   (a) a ceramic having a surface;
   (b) a support having a support surface capable of receiving the surface of the ceramic; and
   (c) a bond between the ceramic surface and the support surface, the bond comprising a wire mesh in a metal.

16. The support assembly of claim 15 wherein the wire mesh comprises copper, aluminum, or steel.

17. The support assembly of claim 15 wherein the metal comprises one or more of indium, lead, magnesium, tin, bismuth, aluminum, copper, silver, zinc, and nickel.

18. The support assembly of claim 15 wherein the wire mesh comprises copper and the metal comprises indium.

19. The support assembly of claim 15 further comprising a surface wetting compound applied on one or more of the ceramic surface and the support surface.

20. The support assembly of claim 15 wherein the support comprises channels capable of circulating heat transfer fluid therethrough.

21. The support assembly of claim 15 wherein the ceramic comprises an electrode therein.

22. The support assembly of claim 15 wherein the support comprises a metal.

23. The support assembly of claim 15 wherein the wire mesh comprises interlocking strands substantially parallel to the lower surface and the support surface.

24. The support assembly of claim 15 wherein the wire mesh comprises interlocking strands.

25. The support assembly of claim 24 wherein the interlocking strands are oriented relative to one another.

26. The support assembly of claim 24 wherein the interlocking strands are randomly oriented.

27. The support assembly of claim 15 wherein the wire mesh comprises strands that are woven or felted.

28. The support assembly of claim 15 wherein the wire mesh comprises a metal, ceramic or polymer.

29. A support assembly capable of supporting a substrate in a process chamber, the support assembly comprising:
    (a) an electrostatic chuck comprising a ceramic having an electrode therein, the electrostatic chuck having an upper surface capable of receiving the substrate and a lower surface;
    (b) a support having a surface capable of receiving the lower surface of the electrostatic chuck; and
    (c) a bond between the lower surface and the support surface, the bond comprising a wire mesh in a compliant material.

30. The support assembly of claim 29 wherein the wire mesh comprises a metal, ceramic, or polymer.

31. The support assembly of claim 29 wherein the wire mesh comprises a perforated metal sheet.

32. The support assembly of claim 29 wherein the wire mesh comprises a bundle of strands that are woven or felted, the bundle of strands having multiple apertures.

33. The support assembly of claim 29 wherein the wire mesh comprises interlocking strands.

34. The support assembly of claim 33 wherein the interlocking strands are oriented relative to one another.

35. The support assembly of claim 33 wherein the interlocking strands are randomly oriented.

36. A support assembly capable or supporting a substrate in a process chamber, the support assembly comprising:
    (a) an electrostatic chuck comprising a dielectric and an electrode, the electrostatic chuck having a lower surface;
    (b) a support having a support surface capable of receiving the lower surface of the electrostatic chuck; and
    (c) a bond between the lower surface of the electrostatic chuck and the support surface, the bond comprising a wire mesh.

37. The support assembly of claim 36 wherein the bond comprises the wire mesh in a material.

38. The support assembly of claim 36 wherein the bond comprises the wire mesh in a metal.

39. The support assembly of claim 36 wherein the dielectric comprises ceramic.

40. The support assembly of claim 36 wherein the dielectric comprises a monolithic ceramic.

41. The support assembly of claim 36 wherein the wire mesh comprises a metal, ceramic, or polymer.

42. The support assembly of claim 36 wherein the wire mesh comprises interlocking strands.

43. The support assembly of claim 42 wherein the interlocking strands are oriented relative to one another.

44. The support assembly of claim 42 wherein the interlocking strands are randomly oriented.

45. The support assembly of claim 36 wherein the wire mesh comprises strands that are woven or felted.

46. A process chamber capable of processing a substrate, the process chamber comprising:
    (a) an electrostatic chuck comprising a ceramic having an electrode therein, the electrostatic chuck having an upper surface capable of receiving the substrate, and the electrostatic chuck having a lower surface;
    (b) a support having a support surface capable of receiving the lower surface of the electrostatic chuck;
    (c) a bond between the lower surface of the electrostatic chuck and the support surface, the bond comprising a wire mesh;
    (d) a gas distributor capable of introducing process gas into the process chamber; and
    (e) a gas energizer capable of energizing the process gas.

47. The process chamber of claim 46 wherein the wire mesh is in a metal.

48. The process chamber of claim 47 wherein the metal comprises one or more of indium, lead, magnesium, tin, bismuth, aluminum, copper, silver, zinc, and nickel.

49. The process chamber of claim 46 wherein the wire mesh comprises a coefficient of thermal expansion that is from about 0.4 to about 1.6 times the average coefficient of thermal expansion of the ceramic and the support.

50. The process chamber of claim 46 wherein the wire mesh comprises a metal, ceramic, or polymer.

51. The process chamber of claim 46 wherein the wire mesh comprises a perforated metal sheet.

52. The process chamber of claim 46 wherein the support comprises channels capable of circulating heat transfer fluid therethrough.

53. A method of using the process chamber of claim 52, the method comprising the steps of:
    (1) supplying a voltage to the electrode of the electrostatic chuck to electrostatically hold the substrate to the upper surface of the ceramic of the electrostatic chuck;
    (2) forming a plasma from process gas introduced into the process chamber; and
    (3) regulating the temperature of the substrate held on the electrostatic chuck by circulating heat transfer fluid through the channels in the support.

54. The process chamber of claim 46 wherein the wire mesh comprises interlocking strands.

55. The process chamber of claim 54 wherein the interlocking strands are oriented relative to one another.

56. The process chamber of claim 54 wherein the interlocking strands are randomly oriented.

57. The process chamber of claim 46 wherein the wire mesh comprises strands that are woven or felted.

58. A support assembly capable of supporting a substrate in a process chamber, the support assembly comprising:
    a surface capable of receiving the substrate; and
    a bond below the surface, the bond comprising a wire mesh in indium.

59. The support assembly of claim 58 wherein the wire mesh comprises copper, aluminum, or steel.

60. The support assembly of claim 58 wherein the wire mesh comprises interlocking strands.

61. The support assembly of claim 60 wherein the interlocking strands are oriented relative to one another.

62. The support assembly of claim 60 wherein the interlocking strands are randomly oriented.

63. The support assembly of claim 58 wherein the wire mesh comprises strands that are woven or felted.

64. The support assembly of claim 58 wherein the wire mesh comprises a metal, ceramic, or polymer.

* * * * *